United States Patent [19]

Kinuhata et al.

[11] Patent Number: 5,065,804
[45] Date of Patent: Nov. 19, 1991

[54] CUTTER SUPPORTING UNIT FOR TIRE GROOVING APPARATUS

[75] Inventors: Satoru Kinuhata; Masao Takami, both of Kobe; Eiji Shibata, Nakama; Tadahiko Tamura, Kitakyushu, all of Japan

[73] Assignee: Sumimoto Rubber Industries, Ltd., Kobe, Japan

[21] Appl. No.: 679,826

[22] Filed: Apr. 1, 1991

Related U.S. Application Data

[63] Continuation of Ser. No. 285,555, Dec. 16, 1988, abandoned.

[30] Foreign Application Priority Data

Dec. 19, 1987 [JP] Japan .................. 62-322205

[51] Int. Cl.⁵ .................. B29D 30/68; B26D 7/26
[52] U.S. Cl. .................. 157/13; 83/171; 83/875
[58] Field of Search .............. 157/13; 83/171, 875

[56] References Cited

U.S. PATENT DOCUMENTS

| 2,925,125 | 2/1960 | Curry | 157/13 |
|---|---|---|---|
| 3,732,767 | 5/1973 | Habert | 83/171 |
| 3,850,222 | 11/1974 | LeJuene | 83/171 |
| 4,081,017 | 3/1978 | Appleby et al. | 157/13 |
| 4,237,955 | 12/1980 | Clayton | 157/13 |
| 4,311,182 | 1/1982 | Clayton | 157/13 |
| 4,823,665 | 4/1989 | Cavagna | 83/529 |

FOREIGN PATENT DOCUMENTS

| 0054389 | 6/1982 | European Pat. Off. |  |
|---|---|---|---|
| 0190914 | 8/1986 | European Pat. Off. |  |
| 3544285 | 6/1987 | Fed. Rep. of Germany. |  |
| 1118203 | 6/1956 | France | 157/13 |
| 177232 | 8/1986 | Japan . |  |
| 461012 | 2/1937 | United Kingdom . |  |
| 813309 | 5/1959 | United Kingdom . |  |

Primary Examiner—Hien H. Phan
Attorney, Agent, or Firm—Armstrong, Nikaido, Marmelstein, Kubovcik & Murray

[57] ABSTRACT

A cutter supporting unit for a tire grooving apparatus having a tire supporting shaft and a cutter supporting unit which brings a cutter in or out of contact with a tire held by the tire supporting shaft, wherein that said cutter supporting unit includes a cutter holder which holds the cutter and a cutter supporting frame to which the cutter holder is releasably connected. The unit largely reduces time and labor necessary for the cutter replacement and improves tire grooving productivity.

2 Claims, 4 Drawing Sheets

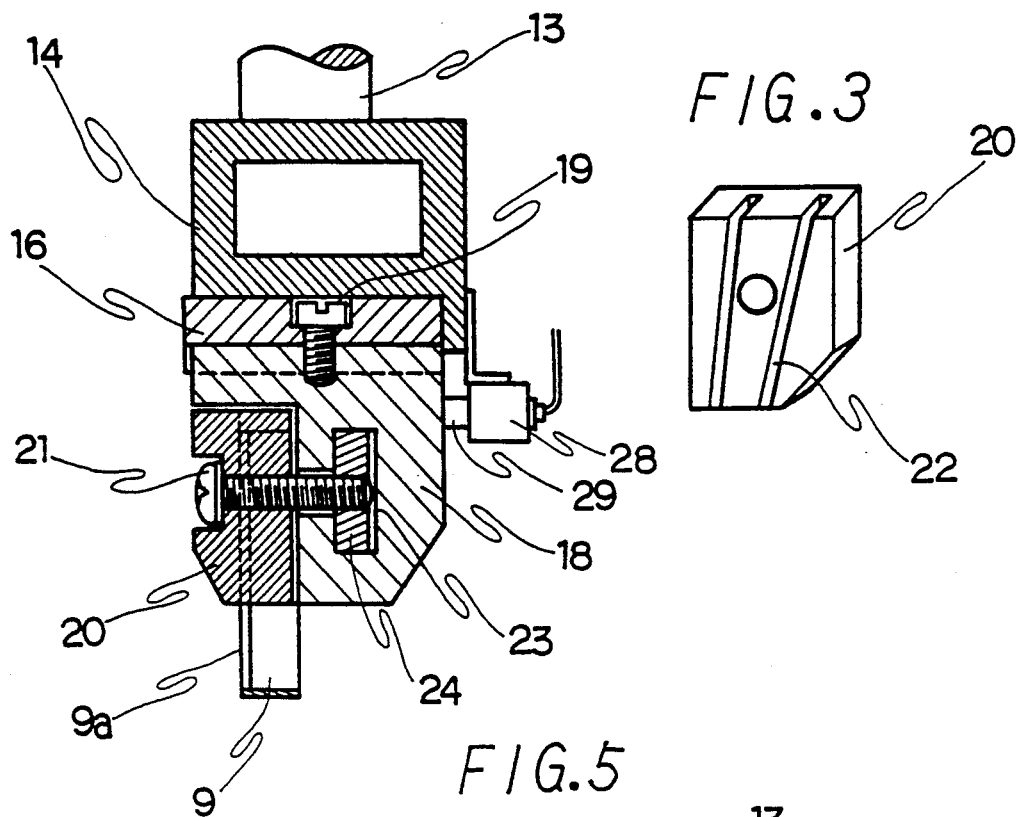
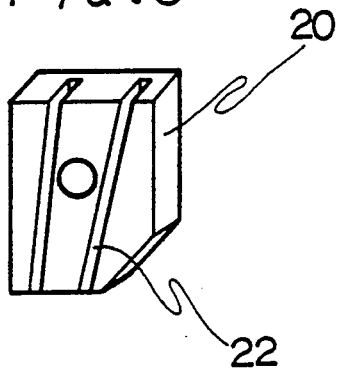
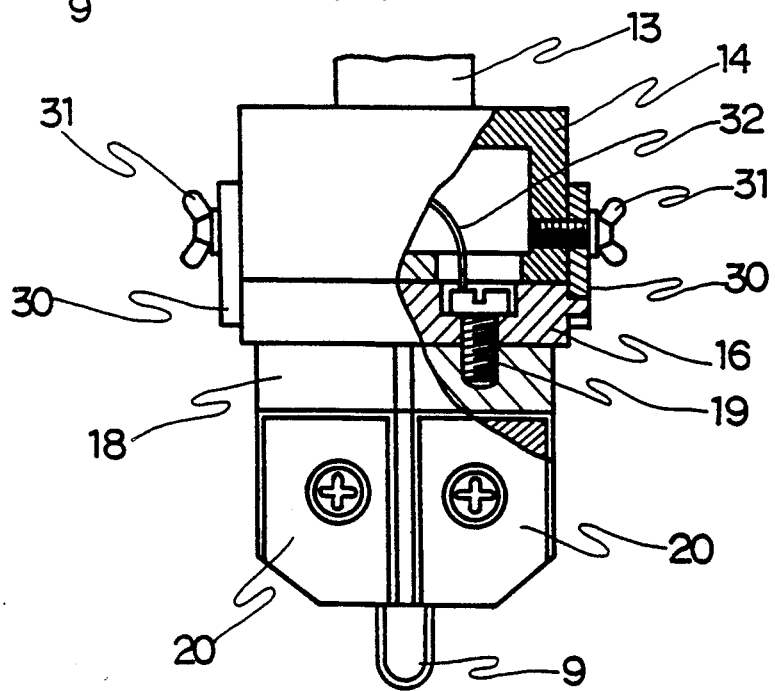

CUTTER SUPPORTING UNIT FOR TIRE GROOVING APPARATUS

This application is a continuation of application Ser. No. 285,555 filed Dec. 16, 1988, now abandoned.

BACKGROUND OF THE INVENTION

The present invention relates to a cutter supporting unit adapted in a tire grooving apparatus.

Hitherto, a tire grooving apparatus has, for example, a construction as disclosed in Japanese Unexamined Patent Publication No. 177232/1986 wherein a cutter supporting arm is provided on a supporting stage capable of moving laterally in parallel with a tire supporting shaft for supporting a tire and of moving upwardly or downwardly, and a cutter supporting unit is attached to a rotatable supporting rod which is attached to the cutter supporting arm. This cutter supporting unit is integratedly constituted by a cutter supporting frame fixed to the rotatable supporting rod and a cutter holder, and a cutter is held by the cutter holder with a clamp piece nipping together the cutter and the cutter holder.

Since the conventional cutter supporting unit as mentioned above is integratedly assembled with the cutter supporting arm and the cutter supporting unit itself has an integrated construction, the replacement of the cutter is carried out by removing and fastening the clamp piece located at the end of the tire supporting unit when the replacement of the cutter is required due to wear or breakage or required due to the necessity of changing the groove shape.

However, in the above conventional cutter supporting unit, the replacement of the cutter is not easy because the cutter is heated up in the grooving operation, and much labor and skill are required in an adjustment work at the time of attaching the cutter, for example, an adjustment of the cutter projection length and an adjustment of the bending angle of the cutter by bending into a particular shape, thus it takes a long time to replace the cutter. Therefore, the above conventional cutter supporting unit has a drawback that productivity is lowered particularly when a plurality of tire grooves having different shapes are formed on one tire using cutters having different shapes.

An object of the present invention is to provide a cutter supporting unit which allows a cutter to be replaced even in heated-up condition and which allows an adjustment of the projection length and an adjustment of the bending angle to be carried out separately before attaching the cutter to a tire grooving apparatus toward enhancing tire grooving productivity.

SUMMARY OF THE INVENTION

In order to attain the above mentioned object, a cutter supporting unit of the present invention employs a construction wherein a cutter supporting unit includes a cutter supporting frame and a cutter holder capable of being connected releasably to the cutter supporting frame, and a cutter is fixed to and held by the cutter holder. In the above construction, the cutter is replaced together with the cutter holder so that the fixing and the adjustment of the cutter can be carried out separately from the replacement operation.

Therefore, a plurality of common cutter holders can be provided and cutters can be fixed thereto in advance with the required shape and projection length being adjusted. Thus, the replacement of the cutter can be carried out by detaching a cutter holder from the cutter supporting frame and attaching another cutter holder thereto in a manner like a cassette replacement, and the next grooving operation can be commenced immediately.

BRIEF DESCRIPTION OF THE DRAWINGS

FIG. 2 is a sectional side view showing the embodiment of FIG. 1;

FIG. 3 is a perspective view of a clamp piece;

FIG. 5 is a front view showing another embodiment of the cutter supporting unit of the present invention.

DETAILED DESCRIPTION

Figure 1:
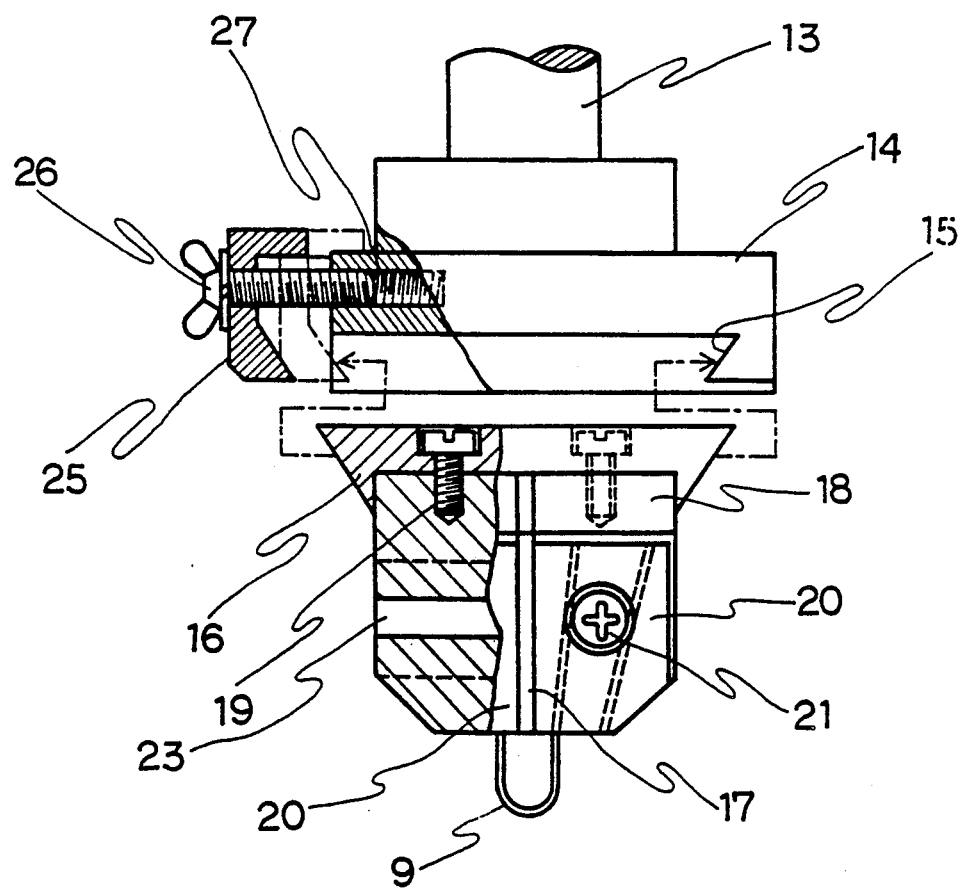
FIG. 1 is an exploded front view, partly in section, showing a major part of an embodiment of the cutter supporting unit of the present invention.

The present invention is explained hereinafter based on embodiments shown in the drawings.

FIG. 1 and FIG. 2 are respectively a front view and a side view showing an embodiment of the cutter supporting unit of the present invention, and FIG. 1 shows a state in which a cutter holder is not engaged with a cutter supporting frame while FIG. 2 shows a state in which the cutter holder is engaged with the cutter supporting frame.

Figure 4:
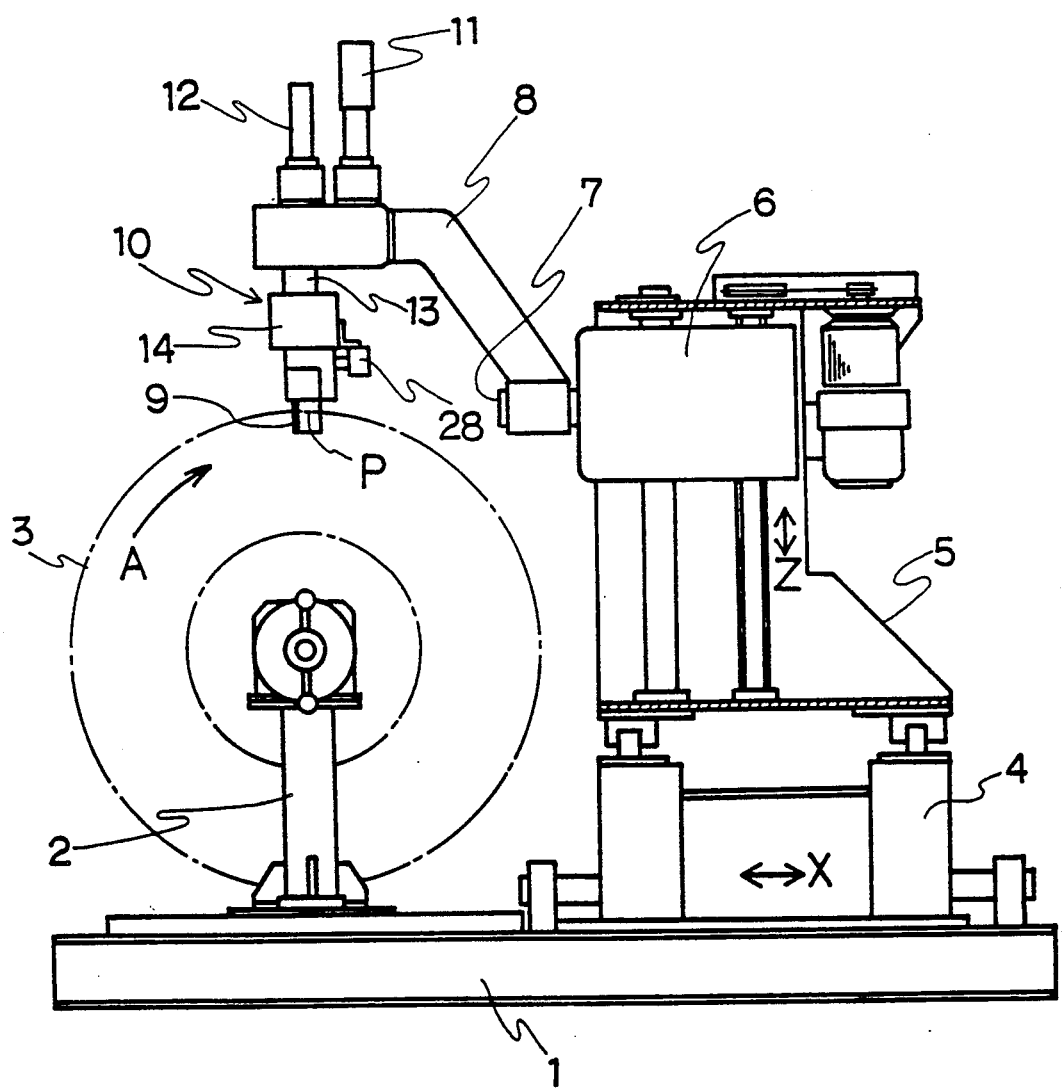
FIG. 4 is a side view showing an example of a grooving apparatus to which the cutter supporting unit of the present invention is applied.

FIG. 4 is a side view showing an example of a grooving apparatus to which the cutter supporting unit of the present invention is applied.

In FIG. 4, the numeral 1 indicates a base, the numeral 2 indicates a tire support which supports a tire 3, and the numeral 4 indicates a horizontally travelling stage which is provided on the base 1 and moves horizontally along the direction of the X-axis perpendicular to a tire supporting shaft of the tire support. A laterally travelling stage 5, which moves along the direction of the Y-axis in parallel with the tire supporting shaft, and a vertically travelling stage 6, which moves up and down along a direction of the vertical Z-axis, are provided on the horizontally travelling stage 4, and a cutter supporting arm 8 is attached to an arm supporting shaft 7 which projects in the direction of the X-axis from the vertically travelling stage 6. The numeral 9 indicates a cutter, and the numeral 10 indicates a cutter supporting unit which is supported by the cutter supporting arm 8.

It should be noted that the grooving apparatus to which the cutter supporting unit of the present invention can be applied is not limited to the apparatus having the above-mentioned construction.

The cutter supporting unit 10 is attached to a cutter supporting rod 13 in such a manner that a cutter supporting frame 14 is fixed to the cutter supporting rod 13 as shown in FIG. 1 and FIG. 2. The cutter supporting rod 13 is attached to the cutter supporting arm 8 and can be rotated by a motor 11 and, if necessary, can be moved up and down by an actuator 12 as shown in FIG. 4. The above cutter supporting frame 14 has an engaging groove 15 having dovetail form at the bottom surface as shown in FIG. 1 and FIG. 2. The numeral 16 is an insulating base of substantially trapezoidal shape so as to be inserted into and engaged with the engaging groove 15 having dovetail form. The above insulating base 16 is fixed to a cutter holder 18 integratedly by a screw 19. The cutter holder 18 has a two-piece construction and comprises two cutter holder segments and an insulating spacer 17 disposed therebetween at the center portion of the cutter holder 18. A pair of clamp pieces 20 are also attached to the cutter holder 18 by screws 21. The numeral 22 shown in FIG. 3 indicates a cutter receiving groove which is formed on the inner surface (the surface touching the cutter holder), the numeral 23 is a T-shaped groove having a sectional shape like T which is laterally formed on the cutter holder 18 and slidably holds a nut 24, and the nut 24 is engaged with a tightening screw 21 which passes through the clamp piece 20. The clamp piece 20 is attached or removed by sliding the nut 24 in the T-shaped groove with the nut 24 being in loosened condition. The numeral 25 is a tightening piece for connecting the cutter supporting frame 14 and the insulating base 16, and the numeral 26 is a tightening screw used together with the tightening piece 25. The tightening screw 26 passes through the tightening piece 25 and engages with a threaded hole 27 of the cutter supporting frame 14. The numeral 28 indicates an electric power supply unit attached to the cutter supporting frame, and a brush 29 is brought in contact with both segments of the cutter holder 18 having two-piece construction, thus the cutter 9 is supplied with electric power and heated up.

In FIG. 4, the tire 3 is mounted on the tire supporting shaft 2 and rotated in the direction of the arrow A, and the cutter 9 is heated up by the electric power supply unit 28. Then the cutter 9 is made to cut in the tread surface of the tire 3 with the cutter supporting unit being moved in the directions of Y-axis and Z-axis by the laterally travelling stage 5 and the vertically travelling stage 6 respectively.

The cutter direction inclined with respect to the tread center line is set by using the motor 11, and a cutting point P of the cutter. 9 is adjusted so that the cutting point P is placed on a line extended from the central axis of the arm supporting shaft 7. This adjustment may be carried out by using the actuator 12.

Various cutters 9 having been differently bent suitably for grooving operation to provide different desired groove shapes are placed in the cutter receiving grooves 22 of the clamp pieces 20 and respectively attached to several cutter holders 18 by means of the tightening screws 21 and the nuts 24 for the preparation in advance for replacements. When the cutter 9 is replaced, the tightening screw 26 is loosened and the tightening piece 25 is brought out of contact with the insulating base 16, then the cutter holder 18 associated with the insulating base 16 and with the clamp pieces 20 are removed from the engaging groove 15 of the cutter holding frame 14. Thereafter, another cutter holder 18 with a cutter 9, which have been prepared in advance as mentioned above, is attached to the cutter supporting frame 14 with the insulating base 16 being placed in the engaging groove 15 havng dovetail form and with the tightening piece 25 being fixed by the tightening screw 26.

In FIG. 5 showing another embodiment, the same numeral as FIG. 1 and FIG. 2 is used as far as it represents the same part. In FIG. 5, there is provided a connecting piece 30 extending over a cutter supporting frame 14 and an insulating base 16, and a tightening screw 31 is loosened and the connecting piece 30 is rotated when a cutter holder 18 is required to be removed. The numeral 32 indicates a lead wire to supply electric power to a cutter 9. The lead wire 32, instead of the electric power supply unit 28, is connected to a screw 19 and electric power is supplied through the cutter holder 18 which is electrically insulated by an insulating spacer 17.

However, there can be employed an alternative construction wherein the tightening screw 31 is provided on the insulating base 16 or wherein a fixed type connecting piece 30 is employed instead of a rotatable type connecting piece 30 and the cutter supporting frame 14 or the insulating base 16 is inserted between both side connecting pieces.

Figure 6:
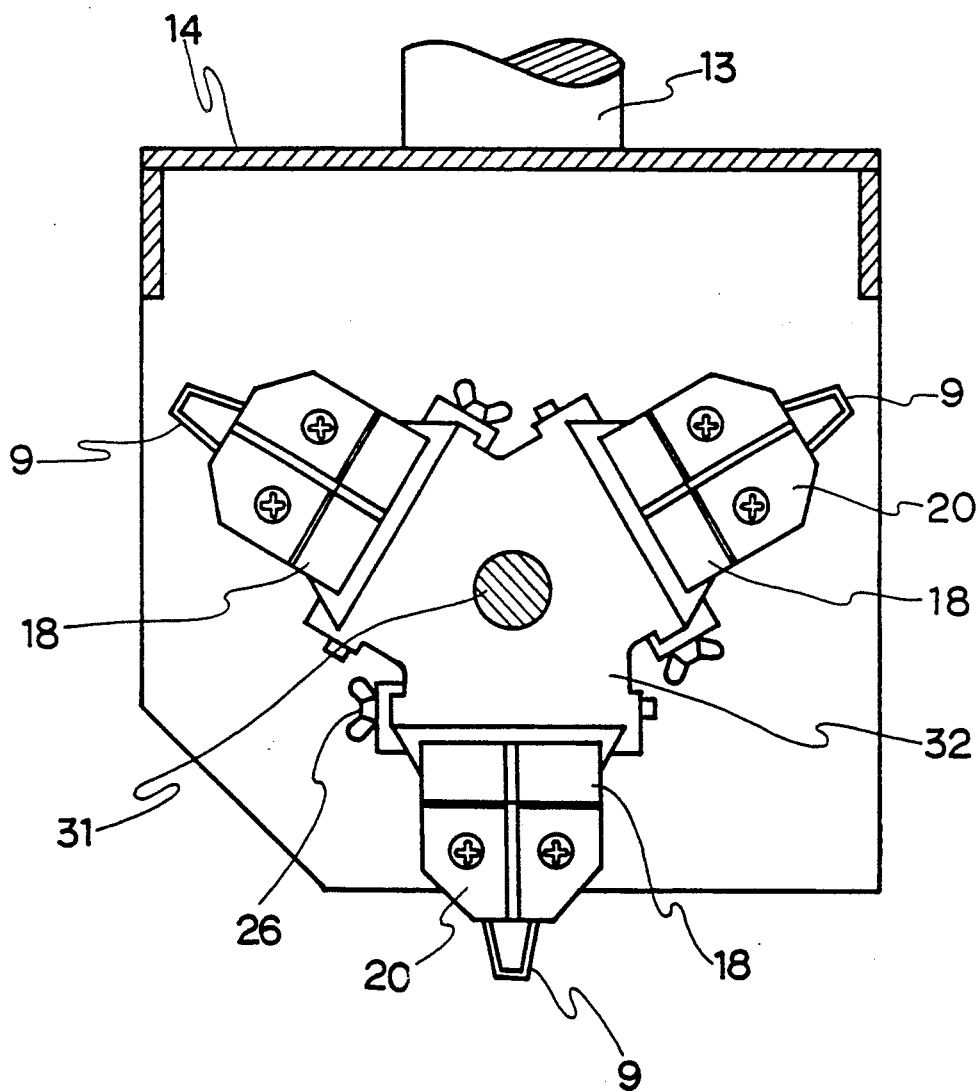
FIG. 6 is a front view showing still another embodiment of the cutter supporting unit of the present invention.

FIG. 6 shows still another embodiment in which three cutter holders 18 are attached to one cutter supporting frame 14. In this embodiment, the cutter supporting frame 14 is provided with a rotatable supporting shaft 31 which supports a rotatable supporting frame 32, and three engaging grooves 15 having dovetail form are provided being spaced equally on the rotatable supporting frame 32. And a cutter holder 18 of the above-mentioned cassette type is attached to each engaging groove 15.

As explained hereinbefore, the cutter supporting unit 10 of the present invention is divided into a cutter supporting frame 14 with a supporting rod 13 and a cutter holder 18 to which a cutter 9 is fixed. Thus, the cutter holder 18 is releasably connected with the cutter supporting frame 14 and the cutters 9 and the cutter holders 18 can be prepared in advance in various types of cassette form according to various cutter requirements, and the cutter replacement can be easily carried out by only detaching and attaching the cassette type cutter holder 18 from and to the cutter supporting frame 14. Therefore, the adjustment of the cutter setting can be completed in the preparation stage of the cassette type cutter holder 18, and required time and labor for the cutter replacement can be reduced considerably.

Further, the cutter supporting unit of the present invention is advantageous because the replacement operation can be carried out in a condition wherein the cutter is heated up. Therefore, productivity can be much improved particularly when many kinds of tire grooves having different shapes are formed on one tire.

What we claim is:

1. A cutter supporting unit for a tire grooving apparatus having a tire supporting shaft and a cutter supporting unit which is movably and detachably supported so as to bring a cutter in and out of contact with a tire held by the tire supporting shaft, said cutter supporting unit comprising:

a cutter holder which holds a cutter; and
   a cutter supporting frame to which the cutter holder is connected removably;
   wherein said cutter supporting frame includes clamping means having an engaging groove formed in a dovetail shape, said clamping means has a tightening piece and a tightening screw, said tightening screw passes through said tightening piece and engages with said cutter supporting frame, and said cutter holder has a base formed in a substantially trapezoidal shape fitting said dovetail shape of said clamping means engaging groove.

2. A cutter supporting unit for a tire grooving apparatus having a tire supporting shaft and a cutter supporting unit which is movably and detachably supported so as to bring a cutter in and out of contact with a tire held by the tire supporting shaft, said cutter supporting unit comprising:
- at least two cutter holders which, respectively, hold cutters;
- a rotatable supporting frame to which said cutter holders are connected removably; and
- a cutter supporting frame having a rotatable supporting shaft which supports said rotatable supporting frame;

wherein said rotatable supporting frame has at least two clamping means, each clamping means having an engaging groove formed in a dovetail shape, said clamping means has a tightening screw, said tightening screw passes through said tightening piece and engages with said rotatable supporting frame, and each of said cutter holders has a base formed in a substantially trapezoidal shape fitting said dovetail shape of the clamping means engaging grooves.

* * * * *